United States Patent
Gillis

(10) Patent No.: US 12,445,628 B2
(45) Date of Patent: Oct. 14, 2025

(54) BANDWIDTH MANAGEMENT USING DYNAMIC QUALITY FACTOR ADJUSTMENTS

(71) Applicant: Sling TV L.L.C., Englewood, CO (US)

(72) Inventor: Greg Gillis, Riverton, UT (US)

(73) Assignee: Sling TV L.L.C., Englewood, CO (US)

( * ) Notice: Subject to any disclaimer, the term of this patent is extended or adjusted under 35 U.S.C. 154(b) by 257 days.

(21) Appl. No.: 17/649,420

(22) Filed: Jan. 31, 2022

(65) Prior Publication Data

US 2023/0247205 A1    Aug. 3, 2023

(51) Int. Cl.
*H04N 19/105*    (2014.01)
*H04N 19/124*    (2014.01)
*H04N 19/136*    (2014.01)
*H04N 19/146*    (2014.01)
*H04N 19/154*    (2014.01)
*H04N 19/184*    (2014.01)
*H04N 19/42*    (2014.01)

(52) U.S. Cl.
CPC ......... *H04N 19/146* (2014.11); *H04N 19/105* (2014.11); *H04N 19/124* (2014.11); *H04N 19/136* (2014.11); *H04N 19/154* (2014.11); *H04N 19/184* (2014.11); *H04N 19/42* (2014.11)

(58) Field of Classification Search
CPC .. H04N 19/146; H04N 19/105; H04N 19/124; H04N 19/136; H04N 19/154; H04N 19/184; H04N 19/42
See application file for complete search history.

(56) References Cited

U.S. PATENT DOCUMENTS

| | | |
|---|---|---|
| 9,338,523 B2 | 5/2016 | Owen |
| 10,410,222 B2 | 9/2019 | Brueck et al. |
| 2014/0040498 A1* | 2/2014 | Oyman ............... H04L 65/1104 709/231 |
| 2015/0326857 A1 | 11/2015 | Zhang et al. |
| 2018/0310009 A1 | 10/2018 | Kopietz |
| 2019/0182512 A1* | 6/2019 | Bhooi ................ H04N 21/4402 |
| 2022/0321892 A1* | 10/2022 | Liu ...................... H04N 19/177 |
| 2022/0337883 A1* | 10/2022 | Grois ................... H04N 19/176 |

OTHER PUBLICATIONS

FFmpeg. Retrieved on Jan. 27, 2022. Retrieved from Internet: <URL: https://trac.ffmpeg.org/wiki/Encode/H.264>.

(Continued)

*Primary Examiner* — Dave Czekaj
(74) *Attorney, Agent, or Firm* — KW Law, LLP

(57) ABSTRACT

Methods and systems are provided for managing bandwidth of an encoded media content stream by dynamically varying the quality of the encoded media content. One method involves encoding the media content using a first value for a quality factor, determining one or more metrics indicative of a bandwidth associated with the encoded portion of the media content, determining an adjustment for the quality factor to obtain an adjusted value for the quality factor based at least in part on a relationship between the one or more metrics indicative of the bandwidth and one or more bandwidth targets, and thereafter encoding a subsequent portion of the media content using the adjusted value for the quality factor.

18 Claims, 3 Drawing Sheets

(56) References Cited

OTHER PUBLICATIONS

Werner Robitza, "CRF Guide (Constant Rate Factor in x264, x265 and libvpx)" Feb. 24, 2017. Retrieved on Jan. 27, 2022. Retrieved from Internet: <URL: https://slhck.info/video/2017/02/24/crf-guide.html>.
PCT International Search Report for International Application No. PCT/US2023/061467 dated Apr. 5, 2023 (3 pages).
Written Opinion of the International Searching Committee for International Application No. PCT/US2023/061467 dated Apr. 5, 2023 (5 pages).

* cited by examiner

BANDWIDTH MANAGEMENT USING DYNAMIC QUALITY FACTOR ADJUSTMENTS

TECHNICAL FIELD

Embodiments of the subject matter described herein relate generally to multimedia distribution, and more particularly, to methods and systems that support dynamically varying a quality factor during encoding.

BACKGROUND

Telecommunications networks, such as the Internet, are expected to become predominant means for distributing multimedia content (e.g., video and audio or audio) to end users. Streaming multimedia content has numerous challenges, including network congestion and bandwidth constraints. Adaptive bitrate streaming is commonly utilized to compensate for delivery issues, at the expense of compromising the video quality, and thereby the viewing experience. While it is also possible to improve streaming capabilities without compromising video quality through dedicated infrastructure upgrades or increased bandwidth allocation, the associated costs and expenditures can be prohibitive. Moreover, failure to fully utilize available bandwidth creates an excess overhead cost that cannot be recouped or reduced. Accordingly, it is desirable to provide techniques for delivering digital media content in a reliable manner, over telecommunications networks, while improving the viewing experience. Other desirable features and characteristics will become apparent from the subsequent detailed description and the appended claims, taken in conjunction with the accompanying drawings and the foregoing technical field and background.

BRIEF SUMMARY

Embodiments of methods, systems, and devices for encoding media content, such as video content of a media program, by dynamically varying the quantization or compression of the media content to manage bandwidth usage. One implementation of a method involves encoding a first portion of the media content using a first value for a quality factor, resulting in an encoded portion of the media content, wherein a first quality associated with the encoded portion of the media content is influenced by the first value for the quality factor, determining one or more metrics indicative of a bandwidth associated with the encoded portion of the media content, determining an adjustment for the quality factor based at least in part on a relationship between the one or more metrics indicative of the bandwidth and one or more targets, resulting in an adjusted value for the quality factor, and thereafter encoding a second portion of the media content using the adjusted value for the quality factor, resulting in a second encoded portion of the media content, wherein a second quality associated with the second encoded portion of the media content is influenced by the adjusted value for the quality factor.

In another embodiment, a computer-readable medium is provided that includes computer-executable instructions stored thereon that, when executed by a processing system, cause the processing system to encode a first portion of media content using an initial value for a quality factor parameter of a rate control mode, resulting in an encoded portion of the media content, wherein a first quality associated with the encoded portion of the media content is influenced by the initial value for the quality factor parameter, determine one or more metrics indicative of a bandwidth associated with the encoded portion of the media content, determine an adjustment for the quality factor parameter based at least in part on a relationship between the one or more metrics indicative of the bandwidth and one or more targets, resulting in an adjusted value for the quality factor parameter, and thereafter encode a subsequent portion of the media content using the adjusted value for the quality factor parameter, resulting in a second encoded portion of the media content, wherein a second quality associated with the second encoded portion of the media content is influenced by the adjusted value for the quality factor parameter.

In another embodiment, an encoding system is provided that includes a codec module and a processing system coupled to the codec module. The codec module is configurable to encode a first portion of media content in a rate control mode using a first value for a quality factor, resulting in an encoded portion of the media content, wherein a first quality associated with the encoded portion of the media content is influenced by the first value for the quality factor. The processing system is configurable to determine one or more metrics indicative of a bandwidth associated with the encoded portion of the media content, determine an adjustment for the quality factor based at least in part on a relationship between the one or more metrics indicative of the bandwidth and one or more targets, resulting in an adjusted value for the quality factor different from the first value for the quality factor, and configure the codec module to encode a subsequent portion of the media content using the adjusted value for the quality factor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to managing the transmission bandwidth or bitrate of streaming media content by dynamically varying a quality factor or quantization factor associated with the streaming media content during encoding of the media content using a rate control mode. That is, the quality factor or quantization factor may vary with respect to time or from one segment of the encoded media content of a media program to a successive segment of the encoded media content of the media program. As used herein, "media content," "media program," "multimedia content," or variants thereof should be understood as referring to any audiovisual programming or content in any streaming, file-based or other format. The media content generally includes data that, when processed by a media player or decoder, allows the media player or decoder to present a visual and/or audio representation of the corresponding program content to a viewer (i.e., user of a device including the media player or decoder). In one or more embodiments, a media player can be realized as a piece of software that plays multimedia content (e.g., displays video and plays audio).

As described in greater detail below, embodiments of the subject matter described herein attempt to maintain the transmission bandwidth substantially constant or otherwise within a threshold range of a reference bitrate during streaming of the media content by dynamically varying the quality of the media content during encoding in real-time on a segment-by-segment basis within the same media program. For example, the reference bitrate may be realized as an amount of available backhaul bandwidth allocated to the encoded media content stream, where the quality associated with the encoded media content stream is dynamically varied to maintain the bandwidth of the encoded media content stream within a target range of the allocated amount of backhaul bandwidth. As a result, streaming the media content mitigates underutilization of allocated backhaul bandwidth by improving content quality, and thereby improving the viewer experience, while also reducing the likelihood of exceeding the allocated backhaul bandwidth by reducing the quality as needed, thereby improving the reliability of transmission, reducing latency, mitigating congestion, and/or the like.

Figure 1:
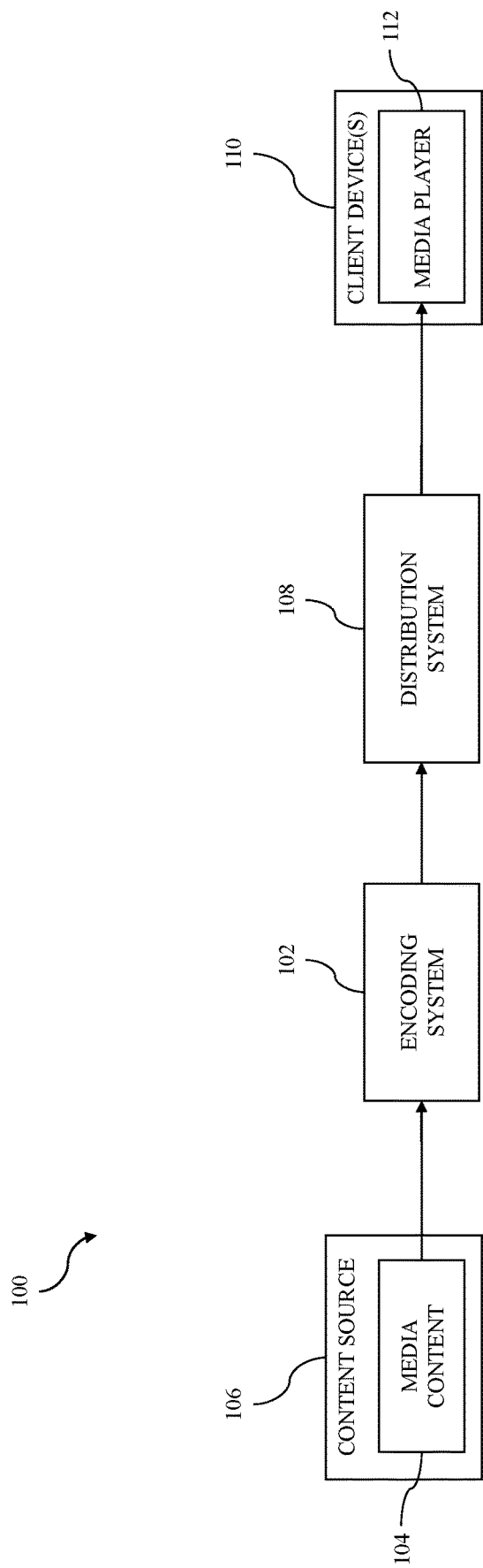
FIG. 1 depicts a block diagram of an exemplary embodiment of a media distribution system.

FIG. 1 depicts an exemplary embodiment of a media distribution system 100 that includes an encoding system 102 that dynamically varies the quality factor or quantization of media content 104 received from a content source 106 prior to transmission to a distribution system 108 over a communications network. The distribution system 108 transmits or otherwise provides the encoded and compressed versions of the media content emanating from the encoding system 102 as compressed segments of the media content 104 to any number of different client devices 110 over a communications network, which, depending on the embodiment, could be realized as a satellite distribution network, a cable distribution network, a cellular communications network, an Internet communications network, or any other suitable distribution or communications network. It should be appreciated that FIG. 1 is a simplified representation of the media distribution system 100 for purposes of explanation and is not intended to be limiting.

The content source 106 generally represents any sort of device or system that generates or otherwise provides audiovisual media content 104 to the encoding system 102 in a high quality format, such as, for example, an uncompressed or raw format. For example, in one or more embodiments, the content source 106 may be realized as a content provider, such as broadcast programming source that provides a broadcast media program or similar broadcast media content formatted for distribution over a broadcast distribution network, a satellite distribution network, or the like. That said, in other embodiments, the content source 106 may be realized as an online programming source, an on-demand programming source, or any other potential source of media content 104. In this regard, it should be appreciated the subject matter described herein is not limited to any particular type of content source 106 or initial content format for the media content 104.

The encoding system 102 generally represents a computing system including hardware, firmware, software, logic, circuitry, and/or other components configured to support receiving or otherwise obtaining signals representative of the media content 104 from the content source 106 and encoding or otherwise converting the media content 104 into fixed duration media segments (or streamlets) emanating from the media content 104 that are compressed by the encoding system 102 that are stored or otherwise maintained in a data storage element at the distribution system 108 (e.g., in a cache of the origin server) for subsequent distribution to content delivery networks (CDNs), client devices 110 and/or the like. In exemplary embodiments, the encoding system 102 includes or otherwise leverages a processing system and a data storage element or other non-transitory computer readable media that stores programming instructions that, when read and executed, cause the processing system to generate, execute, or otherwise implement a dynamic quality factor adjustment module that is configurable to support dynamically varying the quality of the segments (or streamlets) of the encoded media content 104 prior to transmission to the distribution system 108.

As described in greater detail below in the context of FIGS. 2-3, in one or more exemplary implementations, the encoding system 102 is communicatively coupled to the distribution system 108 over a communications network via one or more communications connections having a fixed allocated amount of backhaul bandwidth associated therewith. In this regard, the encoding system 102 dynamically varies the quality of the compression or encoding of the media content 104 to control or otherwise manage the streaming bitrate associated with transmission of the encoded media content emanating from the distribution system 108 substantially equal to or within a threshold range of the fixed allocated amount of backhaul bandwidth associated with a respective connection over the network.

Still referring to FIG. 1, the distribution system 108 generally represents the combination of computing devices and systems capable of streaming, transmitting, or otherwise providing multiplexed encoded media, which is compressed audio and video content of the raw sources 106 of media content 104 received from the encoding system 102 to made ready to stream or distribute to media players 112 executing on client devices 110 for reproducing or otherwise presenting the received versions of the media content 104 at the client devices 110. Depending on the implementation, the distribution system 108 may include one or more origin content servers, one or more CDNs and/or one or more remote storage digital video recorder (RS-DVR) systems that communicatively coupled to a communications network, such as the Internet. The origin content server generally represents a computer system that is configured to store or otherwise maintain the discrete segments or files corresponding to the encoded media content 104 received from the encoding system 102. For example, the origin content server may include one or more caches that store encoded media content 104 for distribution to one or more CDNs and/or RS-DVR systems. The CDN generally represents a third-party system of computers and/or other devices networked together across the communications network that cooperate transparently to deliver content, and may include one or more web servers, cache servers, or the like. Typically, the CDN is configured in a hierarchy so that a client device 110 requests the data from an edge cache, for example, and if the edge cache does not contain the requested data, the request is sent to a parent cache, and so on up to the respective CDN requesting the data from the origin content server. The RS-DVR system generally represents another system of computers and/or other devices networked together across the network and configured to copy or otherwise record media programs on behalf of individual users or subscribers for subsequent playback.

The client devices 110 may be realized as any type of electronic device suitable for communicating with the distribution system 108 over a communications network and presenting or otherwise reproducing encoded media content 104 to a user, such as, for example, a mobile or cellular telephone, a smartphone, a laptop or notebook computer, a tablet computer, a desktop computer, a personal digital assistant, a video game player, a portable media player or another media playback device, an e-reader, a wireless router, a wireless access point, a smart TV, a set-top box (STB), an over-the-top (OTT) streaming device, a gaming console, a television receiver, a satellite receiver, or the like. The client device 110 includes at least a processing system, a data storage element (or memory), and an output device for reproducing media content 104 (e.g., a display device, an audio output device, or the like). The processing system may be implemented using any suitable processing system and/or device, such as, for example, one or more processors, central processing units (CPUs), controllers, microprocessors, microcontrollers, processing cores and/or other hardware computing resources configured to support the operation of the client devices 110 described herein. The data storage element is capable of storing programming instructions for execution by the processing system, that, when read and executed, cause processing system to create, generate, or otherwise facilitate a respective media player application 112 configured to support streaming media content 104 over a network for reproduction by the output device of the respective client device 110. Though the subject matter may be described herein in the context of a media player being a standalone application, in alternative embodiments, the media player may be a web browser plug-in, a combination of browser plug-in and supporting web page logic, or the like.

In one or more implementations, the media player 112 requests individual segments of the encoded and multiplexed media content 104 from a selected content delivery source within the distribution system 108 (e.g., a CDN, an RS-DVR, an origin server, etc.). The respective content delivery source within the distribution system 108 may maintain one or more content files corresponding to the media program to be streamed (e.g., media content 104), which may be realized as an audio or video program, clip, segment, movie, a television broadcast, sports event, movie, music, concert, etc., and which may be live or archived content. The content source for the encoded media content 104 may include individual media segments, which are portions of the media content 104 encapsulated as an independent media object (or file), thereby allowing the streamlets (or segments) to be cached individually and to be independently encoded and multiplexed to be playable by a media player. The content in a media segment may have a unique time index in relation to the beginning of the content contained in the stream. In one implementation, the content contained in each media segment may have a duration of two seconds. For example, media segment 0 may have a time index of 00:00 representing the beginning of content play-back, and media segment 1 may have a time index of 00:02, and so on. In the context of a live event where the media content 104 is anchored to a particular point in time for playing the media content, the media segments may be indexed from or otherwise anchored to a particular point in time. The separate media segments may be requested by a media player 112 from a selected content delivery source of the distribution system 108 using HTTP. That said, in alternative embodiments, the encoded media content 104 may be stored in a single file that is divided into portions that can be cached using HTTP range requests.

Figure 2:
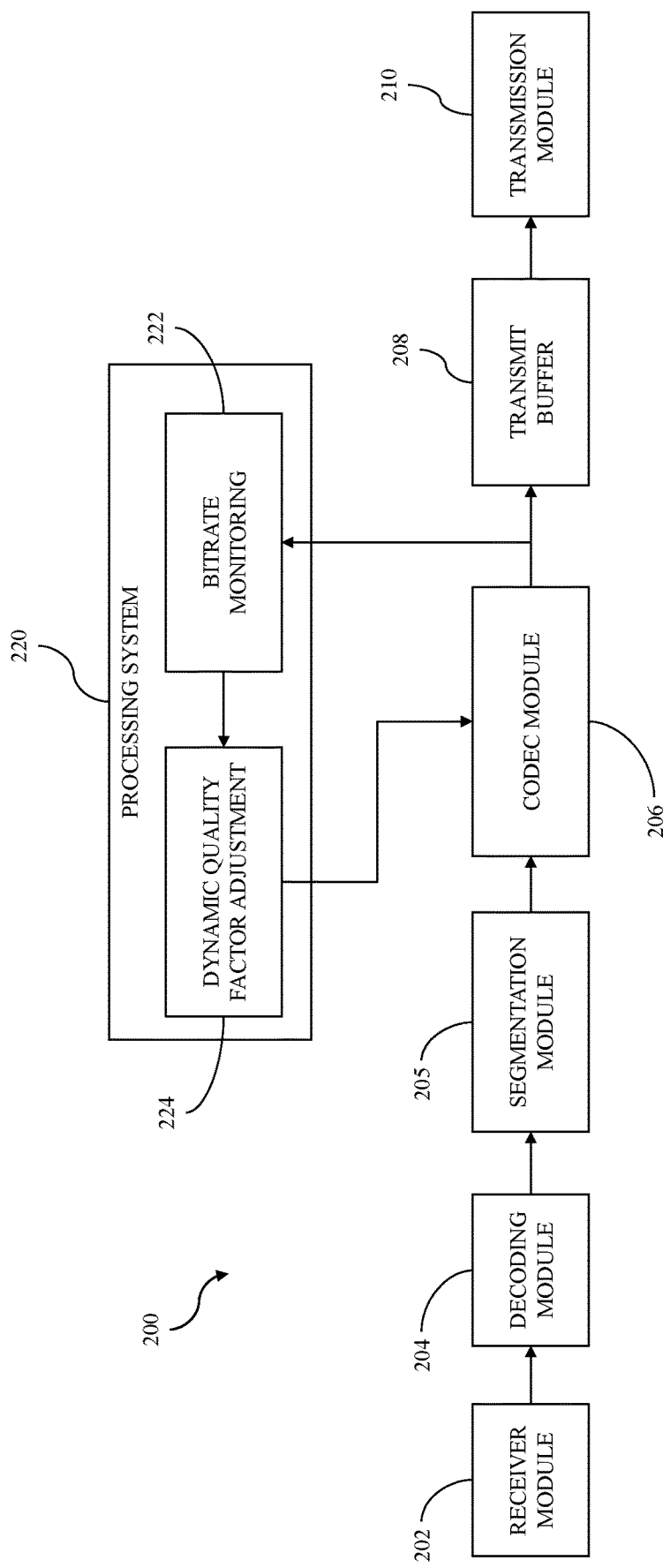
FIG. 2 depicts a block diagram of an exemplary embodiment of an encoding system suitable for use in the media distribution system of FIG. 1.

FIG. 2 depicts an exemplary embodiment of an encoding system 200 suitable for use as the encoding system 102 in the media distribution system 100 of FIG. 1. It should be appreciated that FIG. 2 is a simplified representation of the encoding system 200 for purposes of explanation and is not intended to be limiting. In this regard, while exemplary embodiments may be described herein in the context of the different elements 202, 204, 205, 206, 208, 210, 220 as being implemented separate from one another, in practice, one or more of the elements 202, 204, 205, 206, 208, 210, 220 may be integrated or otherwise combined in a common module or implemented at or by the same computing device that supports the encoding system 200.

The illustrated embodiment of the encoding system 200 includes a receiver module 202, which generally represents the hardware, firmware, software, logic, circuitry, and/or other components that are communicatively coupled to a content source (e.g., content source 106) to receive input media content (e.g., media content 104) to be encoded by the encoding system 102, 200. For example, the receiver module 202 may include one or more antennas, receivers, and/or other components capable of receiving digital broadcast satellite (DBS) signals containing the input media content from a content source via a satellite distribution network. The received media content signals output by the receiver module 202 are input or otherwise provided to a decoding system 204, that generally represents the hardware, firmware, circuitry and/or logic that is configured to convert the received media content signals into a corresponding media content data stream. In this regard, the decoding system 204 may include one or more decoders, tuners, demultiplexers, demodulators, and/or the like that are configurable to obtain the received media content data signals and decode or otherwise convert the received media content data signals from an initial format or encoding utilized by the content source for transmitting the media content into a decoded version. For example, in one implementation, the output of the decoding system 204 is realized as a sequence of individual raw video frames and audio content. The encoding system 200 includes a segmentation module 205 that receives the decoded version of the media content 104 output by the decoding system 204 and then groups or otherwise creates small segments of the individual raw frames into different segments to support adaptive bitrate streaming. Although not illustrated in FIG. 2, practical embodiments of the encoding system 200 may include deinterlacing, scaling, and other systems that process the media content downstream of the decoding module 204 prior to the codec module 206.

The codec module 206 receives the segments of raw frames of the media content output by the segmentation module 205 and then encodes input segments of media content for retransmission and distribution using a novel rate-control engine using adaptive quality factor parameter modulation or adjusting by way of an unsupervised AI processing system 220 that controls the amount of quantization or compression of a respective segment of the input media content, and thereby, the quality of the encoded media content output by the codec module 206. In this regard, in one or more exemplary embodiments, the codec module 206 supports an adaptive average bitrate mode that quantizes or otherwise compresses frames of video content within a respective segment in a manner that attempts to maintain near-constant quality of the video content for that segment at reproduction substantially constant and equal to the quality factor parameter or setting. For example, in one implementation, the codec module 206 is realized as an FFmpeg video codec or open source video codec that supports advanced video coding (H.264) with a constant rate factor (CRF) mode where the quantization or compression of different individual frames within a segment varies by different amounts based on the amount of motion and/or complexity within the respective frames to maintain the perceived quality substantially equal to a desired value for the CRF (e.g., the quality factor setting) for the segment. As a result, the bitrate or bandwidth associated with the encoded video content may vary on a frame-by-frame basis depending on the amount of motion/complexity within a frame or between successive frames to maintain the desired CRF factor for the segment. The codec module 206 may be realized using hardware, firmware, software, logic, circuitry, and/or other components configured to support the rate control processes described herein. For example, in some implementations, the codec module 206 may be realized using an application-specific integrated circuits (ASIC) or other special-purpose hardware, while in other implementations, the codec module 206 may be realized as software that is executed by a processing system or computing device associated with the encoding system 200.

In exemplary embodiments, the encoding system 200 includes a data storage element 208, alternatively referred to herein as a transmit buffer, that is coupled to the codec module 206 to store or otherwise maintain the encoded media content output by the codec module 206 prior to transmission via a transmission module 210. For example, the output of the codec module 206 may be realized as a video elementary stream that is multiplexed with a corresponding audio elementary stream to provide a single program transport stream (SPTS) to be transmitted via a distribution system. In this regard, the transmission module 210 generally represents the transmitters, transceivers, hardware, firmware, software, circuitry and/or logic components of the encoding system 200 that are configured to support communications over a network, such as, a satellite distribution network, a cable distribution network, a cellular communications network, an Internet communications network, or any other suitable distribution or communications network. Although not illustrated in FIG. 2, in some embodiments, the transmission module 210 may also include one or more multiplexers configured to multiplex different streams of encoded media content from different instances of the codec module 206. For example, to support adaptive bitrate streaming, the encoding system 200 may include multiple different redundant instances of the codec module 206 and the transmit buffer 208 for each different quality stream to be encoded in a bitrate ladder, which specifies how many resolution, frame rate, frames per second, and bitrate pairings shall be produced by the codec module 206 for streaming out of the transmission module 210.

Still referring to FIG. 2, in exemplary embodiments, the encoding system 200 includes a processing system 220 that is coupled to the codec module 206 utilizing an unsupervised AI engine to analyze the bitrate associated with the encoded media content output by the codec module 206 and dynamically adjust the quality factor parameter utilized by the codec module 206 on a segment-by-segment basis to control or otherwise manage the bitrate associated with the stream of encoded media content. Based on a relationship between the actual or observed bitrate associated with one or more preceding segments of encoded media content and a reference bitrate for the media content stream, which can vary wildly one segment to the next, the processing system 220 maintains a windowed or ring buffer, or circular buffer, containing the actual bitrates used by previous compressed/encoded segments, the count of which configurable, then based on the adaptive quality control rate-control engine dynamically adjusts the value of the quality factor parameter up or down to control or otherwise regulate the actual bitrate associated with the next encoded segment of media content towards the reference bitrate target. For example, referring again to FIG. 1, the target bitrate may be realized as a fixed amount of backhaul bandwidth allocated to the media content stream on the communications channel between the encoding system 102, 200 and the distribution system 108, where the processing system 220 dynamically varies quality factor parameter to maintain the actual bitrate substantially equal to or within a threshold range of the target bitrate to mitigate underutilization and/or overutilization of the communications channel between the encoding system 102, 200 and the distribution system 108. The buffered actual bitrate usage is utilized so as to not be overreactionary to strange behavior coming from any single segment's encoding results.

The processing system 220 may be implemented or otherwise realized using any suitable processing system and/or device, such as, for example, one or more processors, central processing units (CPUs), controllers, microprocessors, microcontrollers, processing cores and/or other hardware computing resources configured to support the operation of the encoding system 200 described herein. The processing system 220 may also include or otherwise access a data storage element (or memory) capable of storing programming instructions for execution by the processing system 220, that, when read and executed, cause processing system 220 to support the rate control processes described herein. Depending on the implementation, the memory may be realized as a random-access memory (RAM), read only memory (ROM), flash memory, magnetic or optical mass storage, or any other suitable non-transitory short or long-term data storage or other computer-readable media, and/or any suitable combination thereof.

In one or more exemplary implementations, the programming instructions cause the processing system 220 to create, generate, or otherwise facilitate a bitrate monitoring service 222 (or application) that buffers and analyzes the encoded media content to calculate or otherwise determine the actual bitrate associated with the encoded media content stream over a preceding period of time. The bitrate monitoring of 222 feeds an unsupervised modulation block where the actual bitrate usage over a preceding window of encoded segments (e.g., the previous 20 segments) is analyzed to determine various statistics characterizing the distributional aspects of the actual bitrate associated with the encoded media content stream. The programming instructions also cause the processing system 220 to create, generate, or otherwise facilitate a dynamic quality factor adjustment service 224 (or application) that analyzes the relationship between a target bitrate for the encoded media content stream and the actual bitrate associated with the encoded media content stream determined by the average bitrate-based monitoring service 222 in concert with the statistical metric(s) characterizing the tail distributions of the bitrate to dynamically increase or decrease the value of the quality factor parameter utilized by the codec module 206. In this manner, the dynamic quality factor adjustment service 224 dynamically varies the quality of the encoded media content to regulate the bitrate of the encoded media content to be substantially equal to (or within a threshold range of) the target bitrate, thereby mitigating underutilization of the backhaul bandwidth allocated to the media content stream while also reducing the likelihood of exceeding the amount of available bandwidth. It should be noted that although FIG. 2 depicts the services 222, 224 as being separate and distinct from one another, in practice, the services 222, 224 may be integrated or otherwise combined in a common software module or common source code that is executed or otherwise implemented at or by the processing system 220.

Figure 3:
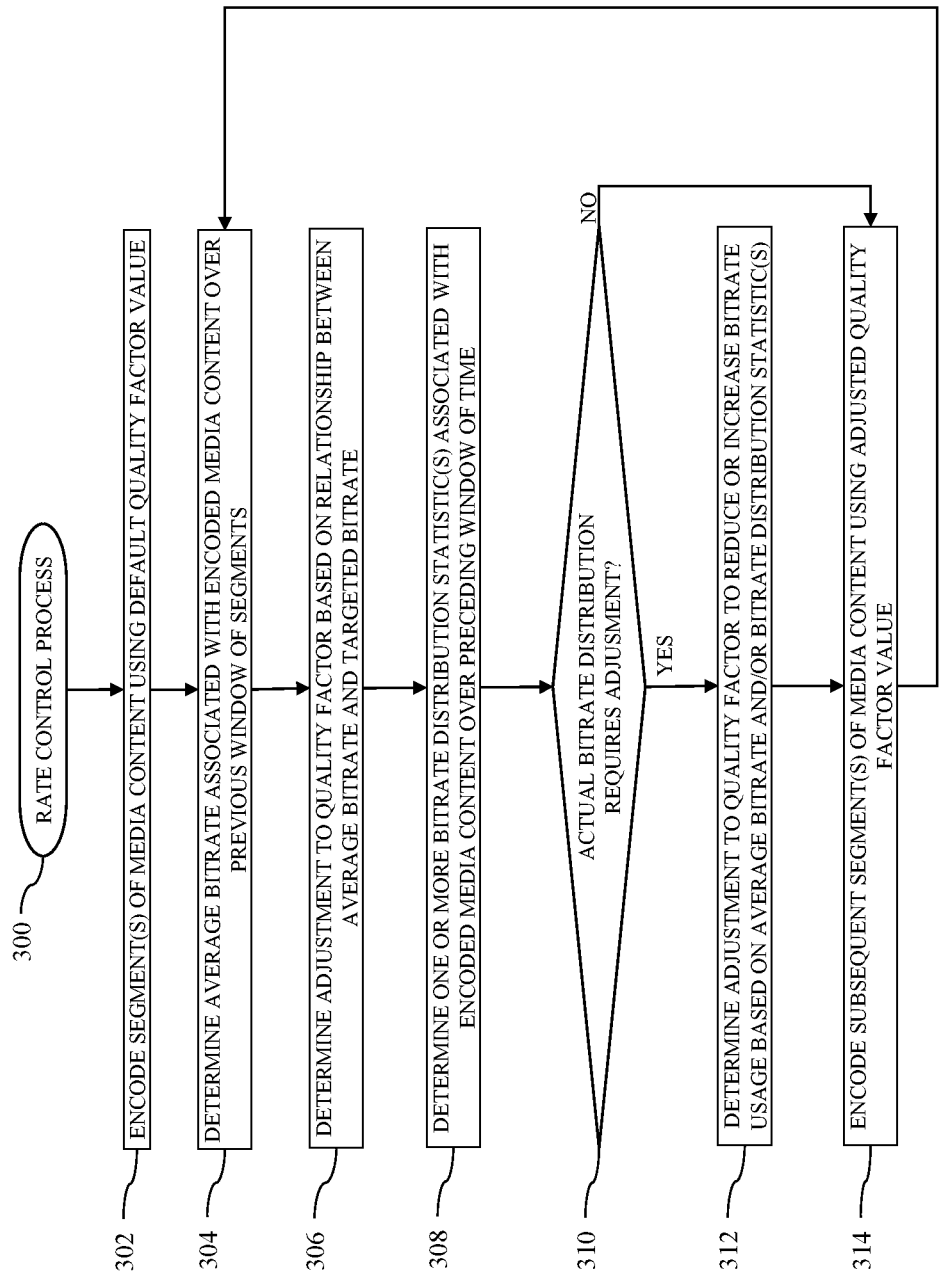
FIG. 3 is a flowchart of an exemplary rate control process suitable for implementation by the encoding system of FIG. 2 in accordance with one or more embodiments.

FIG. 3 depicts an exemplary embodiment of a rate control process 300 suitable for implementation by an encoding system in a media distribution system, such as the encoding system 102, 200 in the media distribution system 100 of FIG. 1, to control or otherwise regulate the bitrate or bandwidth associated with a stream of encoded media content by dynamically varying the quality, quantization or compression of the media content on a segment-by-segment basis, based on what bitrate distribution behavior has been demonstrated over the last 30 to 40 seconds so as to not overreact to any individual segment that may exhibit anomalously high or low bitrate usage. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of rate control process 300 may be performed by different elements of an encoding system 102, 200. That said, for purposes of explanation, the rate control process 300 is described here in the context of primarily being performed by a bitrate monitoring service 222 and a dynamic quality factor adjustment service 224 implemented by or at a processing system 220 coupled to a codec module 206 encoding media content in accordance with a quality factor parameter. It should be appreciated that the rate control process 300 may include any number of additional or alternative tasks, the tasks need not be performed in the illustrated order and/or the tasks may be performed concurrently, and/or the rate control process 300 may be incorporated into a more comprehensive procedure or process having additional functionality not described in detail herein. Moreover, one or more of the tasks shown and described in the context of FIG. 3 could be omitted from a practical embodiment of the rate control process 300 as long as the intended overall functionality remains intact.

Referring to FIG. 3 with continued reference to FIGS. 1-2, the illustrated rate control process 300 initializes or otherwise begins by encoding media content using a default initial quality factor (task 302). In this regard, upon initialization of a new stream of media content associated with a media program for encoding and distribution, the processing system 220 commands, instructs or otherwise configures the codec module 206 to encode the initial incoming portions of media content in accordance with a rate control mode by initially using a default value for a quality factor parameter of the rate control mode, where the initial default value is expected to achieve a desired tradeoff between the quality or quantization of the media content and the resulting bandwidth associated with the encoded media content. In embodiments where the encoding system 102, 200 or the media content stream is allocated a fixed amount of backhaul bandwidth for transmitting the encoded media content to a distribution system 108, the initial default value may be set to a value that is expected to result in the bandwidth associated with the encoded media content being less than or equal to the allocated backhaul bandwidth. The codec module 206 receives one or more segments of decoded raw video frames of the media content from the segmentation module 205 and quantizes or otherwise compresses each frame of each respective segment in the rate control mode using the initial default value for the quality factor in concert with encoding the individual frames for transmission to the distribution system 108. For example, in embodiments where the codec module 206 is realized as an FFmpeg video codec that supports the CRF mode. The FFmpeg CRF mode utilizes a CRF value throughout the entire encoding of a video asset, where the CRF mode in x264 video compression implementation of FFmpeg provides codec logic allowing for small upward and downward adjustment of the quality factor within a frame (intra-frame), which is automatic and depends on motion and complexity within each fixed frame. In embodiments described herein, rather than relying on a single CRF value for the entire video asset, the processing system 220 is initialized to use an initial value of 23 for the quality factor to be used in the codec module 206 during a priming stage to provide an initial reference bitrate usage to be subsequently utilized to dynamically adjust the quality factor in a closed-loop manner. In this regard, the codec module 206 (x264 or x265) may vary the quantization or compression of different macroblocks within individual fixed frames, each frame always beginning processing with the current quality factor value. For each consecutive/respective frame, the actual quality factor utilized by the codec module 206 may vary up or down based on the amount of motion/complexity within the individual frame to maintain the perceived quality of the encoded frame substantially equal across frames. This is done by the codec module 206 without regard to the utilized bitrate because it is the quality level that is fixed. In this regard, the subject matter describe herein varies the quality factor value on a segment-by-segment basis, thereby allowing the codec module 206 to perform its respective variations of the quality factor relative to the current quality factor value associated with the segment currently being encoded on a frame-by-frame basis or intraframe basis for the frames associated with that segment based on motion/complexity associated with the respective frames. In this regard, after each segment is encoded by the codec module 206, the processing system 220 dynamically adjusts the quality factor value (or CRF value) to be used as a reference by the codec module 206 when encoding the frames associated with that next subsequent segment. Thus, by varying the quality factor value (or CRF value) to be utilized by an x264/x265 codec module 206 in the CRF mode on a segment-by-segment basis, the subject matter described herein accounts for the actual bitrate usage.

In exemplary embodiments, prior to dynamically varying the value for the quality factor parameter provided the codec, the rate control process 300 encodes at least a threshold number of segments of the media content using the initial default quality factor until the number of segments of the encoded media content is greater than a threshold amount. In this regard, the threshold amount of encoded media content represents a minimum amount of the media content to be encoded (or minimum sample size) before analyzing the bandwidth associated with the encoded media content. For example, in one example implementation, the processing system 220 monitors the number of encoded segments or frames of the media content that have been stored or otherwise maintained in the transmit buffer 208 until the number of previously encoded segments or frames is greater than a threshold number (e.g., greater than 20 segments). In this regard, in one or more embodiments, the encoded frames of the media content are logically grouped or otherwise encapsulated into fixed duration segments (or streamlets), where a threshold number of segments may be utilized to ensure at least a minimum duration of the media content has been encoded before analyzing the bitrate. For example, in an embodiment where the media content is realized as video content having 30 frames per second encoded into segments having a fixed-time duration (e.g., 2.048 seconds), the processing system 220 and/or the bitrate monitoring service 222 may verify at least 20 segments have been encoded prior to analyzing the bandwidth associated with the encoded media content. That said, it should be appreciated the subject matter described herein is not limited to any particular threshold or criteria for determining when to initiate dynamic adjustment of the quality factor.

Once an initial subset of segments of the media content has been encoded using the initial default value for the quality factor, the rate control process 300 continues by analyzing the bandwidth associated with the segments of encoded media content over a preceding window of time and dynamically adjusting the quality factor based on one or more metrics indicative of the bandwidth associated with the encoded media content stream in relation to one or more targets when the bandwidth or bitrate usage indicates the quality factor value used for the compression requires adjustment to avoid overutilizing or underutilizing available bandwidth (tasks 304, 306). In this regard, the rate control process 300 attempts to regulate or otherwise control the actual bandwidth of the encoded media content stream to a target bandwidth by dynamically varying the quality, quantization or compression of individual segments of the encoded media content to maintain the actual bandwidth within a threshold range of the target bandwidth. Additionally, as described in greater detail below, the rate control process 300 analyzes the distribution or other statistics associated with the bandwidth associated with the segments of encoded media content over a preceding window of time and dynamically adjusts the quality factor based on one or more metrics indicative of the distribution of the bandwidth associated with the encoded media content stream to avoid overutilizing or underutilizing available bandwidth (tasks 308, 310, 312). The resulting adjustments are added to, subtracted from, or otherwise utilized to modify the current value for the quality factor parameter or setting utilized by the codec to obtain an updated adjusted quality factor that increases and/or decreases the quantization and compression as appropriate to avoid overutilizing or underutilizing available bandwidth, which, in turn, is then utilized to encode one or more segments of media content (task 314) until the bitrate usage and/or distribution associated with those subsequently compressed and encoded segments indicates further adjustment to the quality factor should be performed. In this regard, in exemplary embodiments, the loop defined by tasks 304, 306, 308, 310, 312 and 314 repeats on a segment-by-segment basis during encoding and streaming of the media content for a media program to dynamically vary or otherwise adjust the quality of the encoded media content up or down in an attempt to maintain a substantially constant transmission bandwidth that is equal to or otherwise within a desired range of a target bitrate while mitigating excursions above or below the available or allocated amount of bandwidth for transmitting the encoded media content.

In the illustrated embodiment, the rate control process 300 calculates or otherwise determines an average bitrate associated with the most recent subset of encoded media content over a preceding window of time (task 304). For example, in one embodiment, the bitrate monitoring service 222 monitors the encoded segments output by the codec module 206 and the timestamps associated therewith to identify the segments most recently encoded over a preceding monitoring time period (e.g., 1 minute). For each frame or segment of the encoded media content within the preceding monitoring time period, the bitrate monitoring service 222 may identify or otherwise determine the total number of bits associated with the respective frame or segment, and then divide the total number of bits by the duration of time associated with the respective frame or segment to obtain the average bitrate associated with the respective frame or segment. For example, for video content having a frame rate of 30 frames per second, the bitrate monitoring service 222 may determine the number of bits associated with the encoded frame and divide the total number of bits by $\frac{1}{30}^{th}$ of a second (or multiply the total number of bits by 30) to obtain an average bitrate associated with the respective frame. As another example, for an encoded segment of video having a fixed time duration, the bitrate monitoring service 222 may determine the number of bits associated with all of the encoded frames that make up that segment and then divide the total number of bits by the duration of the segment to obtain an average bitrate associated with the respective segment. In some implementations, the average bitrate is calculated or otherwise determined in relative terms as a percentage of the target bitrate.

After determining the average bitrate over the preceding monitoring period, the rate control process 300 determines whether the average bitrate is within a target bitrate range of the target bitrate for the encoded media content stream. In this regard, the target bitrate range may be chosen to allow the actual bitrate to fluctuate up or down about the target bitrate without adjusting the quality factor while the average bitrate is maintained within the target bitrate range or otherwise substantially equal to the target bitrate. When the average bitrate is outside the target bitrate range, the rate control process 300 calculates or otherwise determines an adjustment to the quality factor based on a relationship between the average bitrate and the target bitrate range (task 306). In this regard, based on the relationship between the average bitrate over the preceding monitoring period and a target bitrate for the encoded media content stream, the dynamic quality factor adjustment service 224 calculates or otherwise determines an adjustment to the value for the quality factor to reduce the difference between the average bitrate and the target bitrate. For example, when the average bitrate over the preceding window of time is less than the target bitrate by more than a threshold amount or otherwise below the target bitrate range, the dynamic quality factor adjustment service 224 determines an adjustment that decreases the quantization applied by the codec module 206 to the next segment of the media content in order to increase the quality of the frames associated with the next segment, and thereby increases the bitrate associated with the media content stream. In this manner, when the target bitrate is equal to an allocated amount of bandwidth for the media content stream, the rate control process 300 increases video quality to avoid underutilization of allocated bandwidth. On the other hand, when the average bitrate over the preceding window of time is greater than the target bitrate by more than a threshold amount or otherwise exceeds the target bitrate range, the dynamic quality factor adjustment service 224 determines an adjustment that increases the quantization applied by the codec module 206 to the next segment of the media content to decrease the quality of the frames of the next segment, and thereby decreases the bitrate associated with the media content stream (e.g., to avoid exceeding allocated bandwidth).

In one embodiment, the bitrate monitoring service 222 outputs or otherwise provides the average bitrate calculated for the subset of encoded media content segments encompassing the preceding monitoring period to the dynamic quality factor adjustment service 224. Based on the relationship between the average bitrate and the target bitrate range, the dynamic quality factor adjustment service 224 calculates or otherwise determines an offset amount that is to be added to the current (or most recent) value for the quality factor to obtain an adjusted value for the quality factor that is equal to the initial value plus or minus that offset. In one implementation, the calculates the offset for adjusting the quality factor based on a ratio of the average bitrate to a reference bitrate that represents an upper or lower bounds for a target range for the actual bitrate that encompasses the target bitrate. When the average bitrate is less than the lower bounds for the target bitrate range or otherwise less than the target bitrate by more than a threshold amount, the dynamic quality factor adjustment service 224 calculates a ratio by dividing the average bitrate over the preceding monitoring window by the lower bounds for the target bitrate range to obtain a representation of the average bandwidth as a percentage of the lower bounds for the target bitrate range. For example, when the average bitrate is 80% of the target bitrate, and the target bitrate range is defined by lower and upper bounds of 95% to 105% of the target bitrate, the dynamic quality factor adjustment service 224 calculates the ratio of the average bitrate to the lower bounds of the target bitrate range (e.g., 80/95).

In a similar manner, when the average bitrate is greater than the upper bounds for the target bitrate range or otherwise greater than the target bitrate by more than a threshold amount, the dynamic quality factor adjustment service 224 calculates a ratio by dividing the average bitrate over the preceding monitoring window by the upper bounds for the target bitrate range to obtain a representation of the average bandwidth as a percentage of the upper bounds for the target bitrate range. For example, when the average bitrate is 110% of the target bitrate, and the target bitrate range is defined by upper bounds of 105% of the target bitrate, the dynamic quality factor adjustment service 224 calculates the ratio of the average bitrate to the upper bounds of the target bitrate range (e.g., 110/105).

Based on the ratio or percentage of the average bitrate relative to the respective lower or upper bounds for the target bitrate range, the dynamic quality factor adjustment service 224 calculates or otherwise determines an offset amount in the scale or domain associated with the quality factor. For example, for FFmpeg where the range or scale associated with the CRF is exponential and a change in the CRF value by 6 results in a doubling or halving of the bitrate, the dynamic quality factor adjustment service 224 may calculate the offset using a logarithm of the ratio of the actual bandwidth to the target bitrate range boundary using the equation offset=$6 \log_2 b_a/b_r$, where $b_a$ represents the average bitrate for the encoded media content (or average percentage of the target bitrate) calculated over the preceding monitoring period and $b_r$ represents a reference bitrate (or percentage of the target bitrate) that defines the respective upper or lower bounds for the target bitrate range that is violated by the average bitrate. That said, it should be noted that in some alternative embodiments, the target bitrate may be utilized as the reference bitrate to determine the offset.

The dynamic quality factor adjustment service 224 adds the calculated offset amount to the current CRF value to obtain an adjusted CRF value that compensates for the deviation in the average bitrate relative to the target bitrate range. In this regard, when the average bitrate is less than the lower bounds of the target bitrate range, the calculated offset value is negative, and thereby decreases the CRF value. Decreasing the CRF value increases the levels of quantization applied by the codec module 206 (or reduces compression) to increase the quality of the subsequently encoded media content to improve the quality, and thereby, increase the bitrate or bandwidth of subsequently encoded frames or segments of the media content. On the other hand, when the average bitrate is greater than the upper bounds of the target bitrate range, the calculated offset value is positive, and thereby increases the CRF value, which in turn, decreases the levels of quantization applied by the codec module 206 (or increases compression) to decrease the quality of the subsequently encoded media content to reduce the quality, and thereby, reduce the bitrate or bandwidth of subsequently encoded frames or segments of the media content.

In one or more embodiments, the dynamic quality factor adjustment service 224 may utilize machine learning or other artificial intelligence techniques for determining an offset or other adjustment to the quality factor based on historical relationships between quality factor values, the resulting bandwidth of encoded media content using the respective quality factor value, historical adjustments to the quality factors, and the respective resulting changes in bandwidth of encoded media content in response to the respective historical adjustments to the quality factor. In such embodiments, the dynamic quality factor adjustment service 224 may utilize an equation or model for calculating an adjustment to the quality factor as a function of the current value for the quality factor and the current average bitrate over the preceding monitoring window of time. It should be appreciated that any number of different machine learning and/or artificial intelligence techniques may be employed to derive a model or equation for calculating a quality factor adjustment, and the subject matter described herein is not limited to any particular implementation.

Still referring to FIG. 3, in exemplary embodiments, the rate control process 300 also calculates or otherwise determines one or more metrics indicative of the distribution of the bitrate associated with the most recent subset of encoded media content over the preceding window of time, and when the distribution metric(s) indicate a probability of the actual bitrate exceeding an upper bitrate threshold, the rate control process 300 calculates or otherwise determines an additional adjustment to the quality factor to decrease the quality of subsequently encoded segments and thereby reduce the probability of exceeding the available bandwidth (tasks 308, 310, 312). In this manner, the rate control process 300 compensates for positive skew in the actual bitrate of the encoded media content stream to avoid exceeding the amount of available bandwidth or otherwise overutilizing the communications channel between the encoding system 102, 200 and the distribution system 108. When the average bitrate of the encoded media content stream also exceeds the target bitrate (or target bitrate range), the distribution-based adjustment to the quality factor may be additive to the bandwidth-based adjustment or offset calculated based on the average bandwidth (e.g., task 306). On the other hand, when the average bitrate of the encoded media content stream is below the target bitrate (or target bitrate range), the distribution-based adjustment to the quality factor may negate, cancel, or otherwise counteract a bandwidth-based adjustment or offset calculated based on the average bandwidth that would otherwise increase the quality of the encoded media content.

In one or more exemplary embodiments, to analyze the distribution of the bitrate associated with the encoded media content stream, the bitrate monitoring service 222 monitors and analyzes the encoded frames or segments maintained in the transmit buffer 208 in a similar manner as described above (e.g., task 304) to determine the respective bitrate or bandwidth associated with encoded segments or frames of the media content. The bitrate monitoring service 222 implements a counter or similar feature to track or otherwise monitor the number of encoded segments (or frames) of the media content over a preceding monitoring time period that exceed the target bitrate (or target bitrate range) by more than a threshold amount. For example, in one embodiment, the bitrate monitoring service 222 counts the number of encoded segments that exceed the target bitrate by more than 25%. When the total number or percentage of encoded segments over the preceding monitoring window of time is greater than a threshold number or threshold percentage (e.g., 5%), the bitrate monitoring service 222 determines the probability of the bandwidth of the encoded media content stream exceeding the available or allocated bandwidth is greater than a threshold probability and provides a corresponding indication to the dynamic quality factor adjustment service 224 to adjust the quality factor based on the right tail of the actual bandwidth distribution.

In an exemplary embodiment, the dynamic quality factor adjustment service 224 calculates or otherwise determines a distribution-based offset amount in the scale or domain associated with the quality factor based on the ratio of the upper bitrate threshold for determining the probability of exceeding the available bandwidth relative to the upper bound for the target bitrate range. For example, in one implementation, for FFmpeg where the range or scale associated with the CRF is exponential and a change in the CRF value by 6 results in a doubling or halving of the bitrate, the dynamic quality factor adjustment service 224 may calculate the offset using a logarithm of the ratio (or percentage) of the actual bandwidth to a target bitrate by multiplying the log base 2 of the ratio by a factor of 6. The distribution-based offset value is positive, and thereby increases the CRF value, which in turn, decreases the levels of quantization applied by the codec module 206 (or increases compression) to decrease the quality of the subsequently encoded media content to reduce the quality, and thereby, reduce the likelihood of subsequently encoded segments or frames of the media content exceeding the available or allocated bandwidth for the encoded media content stream. In some embodiments, the distribution-based offset amount may be reduced by a factor of 2 (or divided by 2) to reduce the likelihood of overreacting or overcompensating for the distribution of the bitrate associated with the most recently encoded segments over the preceding monitoring period. When the bandwidth-based offset value is negative, in exemplary embodiments, the dynamic quality factor adjustment service 224 also adds the additive inverse or opposite of the bandwidth-based offset value to the distribution-based offset value to negate or otherwise cancel the bandwidth-based offset value.

As described in greater detail below, in some implementations, the rate control process 300 also calculates or otherwise determines an adjustment to the quality factor to increase the quality of subsequently encoded segments and thereby reduce the probability of underutilizing the available bandwidth based on the one or more metrics indicative of the distribution of the bitrate associated with the most recent subset of encoded media content over the preceding window of time. For example, when the distribution metric(s) indicate a probability of the actual bitrate falling below a lower bitrate threshold, the rate control process 300 may calculates or otherwise determines an adjustment to the quality factor to increase the quality of subsequently encoded segments and thereby reduce the probability of underutilizing the available bandwidth.

Referring to FIGS. 2-3, in exemplary embodiments, the dynamic quality factor adjustment service 224 calculates or otherwise determines a new or updated adjusted value for the quality factor by adjusting the current value for the quality factor by any bandwidth-based adjustment and/or any distribution-based adjustment. In this regard, for the initial iteration of the rate control process 300, the dynamic quality factor adjustment service 224 adds the bandwidth-based offset and/or the distribution-based offset to the initial default value for the quality factor to obtain an adjusted value for the quality factor that accounts for the average bitrate and bandwidth distribution. In one or more embodiments, the dynamic quality factor adjustment service 224 clips, clamps or otherwise limits the range of the quality factor to be maintained within a range defined by a minimum quality factor and a maximum quality factor. For example, for FFmpeg where lower values for the CRF correspond to higher quality and vice versa, the dynamic quality factor adjustment service 224 may limit the adjusted value for the CRF to between a maximum CRF value (e.g., to maintain a minimum level of perceived video quality) and a minimum CRF value (e.g., where the human eye does not perceive higher levels of video quality).

After determining an adjusted value for the quality factor that accounts for both the average bandwidth and the bandwidth distribution of the encoded media content stream over a preceding monitoring window of time, the rate control process 300 continues by encoding one or more subsequent portions of the media content in accordance with the rate control mode using the adjusted quality factor (task 314). For example, for an FFmpeg implementation, after determining an adjusted CRF value by adding the bandwidth-based and/or distribution-based offsets to the initial default CRF value, the processing system 220 and/or the dynamic quality factor adjustment service 224 commands, instructs or otherwise configures the FFmpeg codec module 206 to encode the next segment of frames of video content in accordance with the CRF mode using the adjusted CRF value. In this manner, the quality of the subsequent segment of frames of the video content is adjusted up or down relative to the preceding, previously-encoded segments of the video content to control or otherwise manage the bandwidth associated with streaming the encoded video content across the sequence of encoded segments.

In exemplary embodiments, the loop defined by tasks 304, 306, 308, 310, 312 and 314 repeats on a segment-by-segment basis during encoding and streaming of the media content for a media program to dynamically vary or otherwise adjust the quality of the encoded media content up or down to maintain a substantially constant transmission bandwidth that is equal to or otherwise within a desired range of a target bitrate while mitigating excursions above the available or allocated amount of bandwidth for transmitting the encoded media content. For example, upon completion of encoding a segment of the video content, the rate control process 300 may dynamically determine an updated average bitrate associated with the most recent subset of video content encoded within the preceding monitoring window that includes the newly encoded segment of the video content (and the frames contained therein). In this regard, the bitrate monitoring service 222 may effectively maintain a moving average of the bitrate associated with a most recent subset of segments of encoded video content corresponding to the duration of the monitoring period (e.g., over the last minute) and update the count, number or percentage of encoded video segments (or frames) that exceed the upper bitrate threshold and/or other distribution metrics in response to each newly encoded video segment.

As described above, for an FFmpeg implementation using the CRF mode, the FFmpeg codec module 206 utilizes the adjusted value for the CRF provided by the dynamic quality factor adjustment service 224 as the reference level of quantization from which the codec module 206 may vary the quantization or compression of different macroblocks within the respective frames of the newly encoded segment based on the amount of motion within a respective frame to maintain the perceived quality of the encoded frames of the segment substantially equal to the adjusted CRF value defined for that segment. When the adjusted CRF value results in the bitrate of the newly encoded segment falling outside of the target bitrate range by an amount that results in the updated average bitrate of the encoded video content stream falling outside the target bitrate range, the dynamic quality factor adjustment service 224 determines a corresponding adjustment to the CRF value in the appropriate direction based on the updated average bitrate as described above. Additionally, or alternatively, when the adjusted CRF value resulted in the bitrate of the newly encoded segment exceeding the upper bitrate threshold or otherwise indicates a probability of exceeding the available or allocated bandwidth, the dynamic quality factor adjustment service 224 determines a corresponding adjustment to increase the CRF value to mitigate the right tail distribution of the actual bandwidth as described above. Thereafter, the processing system 220 and/or the dynamic quality factor adjustment service 224 commands, instructs or otherwise configures the FFmpeg codec module 206 to encode the frames of the next segment of video content in accordance with the CRF mode using the newly adjusted CRF value in lieu of the previous adjusted CRF value. In this manner, the rate control process 300 emulates a closed-loop control system, where the quality of the encoded video content is dynamically adjusted substantially in real-time on a segment-by-segment basis to manage the bandwidth utilized when transmitting encoded video content over a communications network (e.g., to the distribution system 108 over the Internet via the transmission module 210).

In one or more exemplary implementations, the rate control process 300 utilizes targets for acceptable low or high effective bitrates (e.g., a minimum average bitrate target and a maximum average bitrate target) as well as targets for the lower and upper tail bitrate distribution probabilities (e.g., a maximum number of segments above or below a respective bitrate target over a preceding monitoring period). To initialize or prime the rate control process 300, a default quality factor value (e.g., CRF=23) is utilized to compress an initial number of video segments (e.g., 20 video segments including respective subsets of frames to provide fixed time duration video segments of 2.048 seconds. In this regard, the default quality factor value is maintained constant during compression and encoding of the initial subset of video segments of a media program. After encoding the initial number of video segments with the default quality factor value, the resulting bitrate usage metadata and related statistics (e.g., average bitrate, number of segments above or below a bitrate target, etc.) are calculated or otherwise determined based on those previously encoded video segments, which, in turn, are then utilized to calculate or otherwise determine a quality factor adjustment offset to be applied to the current quality factor value (which initially is the default quality factor value) to obtain an adjusted quality factor value to be utilized when compressing and encoding the next video segment of the media program to address the bitrate usage exhibited by the initial subset of video segments. The adjusted quality factor value is stored as a class member variable that is referenced or otherwise used for each subsequent segment until the bitrate usage conditions indicate the adjusted quality factor value needs to be further adjusted.

For example, after compressing and encoding an initial 20 segments of video content of a media program (where each segment includes a plurality of sequential frames of the video content) using a default quality factor value, determining corresponding bitrate usage metrics associated with the resulting stream of encoded segments of video content, and determining a corresponding quality factor adjustment offset to be applied to the default quality factor value to obtain an adjusted quality factor value (e.g., a CRF of 23 plus or minus the quality factor adjustment offset), the codec module 206 is configured to obtain the next segment of frames of the video content of the media program and compress that segment using the adjusted quality factor value stored as the class member variable referenced by the codec module 206. After compressing that segment, the rate control process 300 (e.g., bitrate monitoring service 222 and/or dynamic quality factor adjustment service 224) calculates or otherwise determines bitrate usage metadata and/or other compression and statistical metadata based on the resulting bitrate of that compressed, encoded video segment in order to determine whether or not to update the quality factor value to be utilized to compress and encode the next video segment. In one implementation, a circular buffer is utilized to maintain the actual video bits per segment (AVB) for each of the preceding 20 compressed and encoded video segments, which corresponds to the duration of the preceding monitoring window or period of time. In this regard, upon completion of compression and encoding of all the frames belonging to the current video segment, the AVB associated with the current or most recently compressed and encoded video segment is inserted into the circular buffer while overwriting, evicting or otherwise cycling out the oldest AVB value from the circular buffer.

Based on the actual bitrate usage in the AVB circular buffer for the 20 most recently compressed and encoded video segments, the equivalent effective average video bits per segment (EAPS) is calculated or otherwise determined by averaging the AVBs currently maintained in the circular buffer. The EAPS is then checked for being over or under the upper or lower target bitrate thresholds to determine whether the quality factor should be adjusted to maintain the EAPS in a target range near or just under the target bitrate. In one implementation, the EAPS is divided by the target bitrate to compute the effective average bitrate percentage (EAVP) that is compared to the desired upper or lower target bitrate thresholds represented as a percentage of the target bitrate. If the EAVP is over the upper bitrate threshold (e.g., 105% of the target bitrate) or below the lower bitrate threshold (e.g., 90% of the target bitrate), a usage-based offset adjustment for the quality factor to be added or subtracted from the current quality factor value is calculated or otherwise determined based on the EAVP. For example, the usage-based quality factor offset adjustment for the CRF in accordance with the H.264 standard may be determined by multiplying the log base 2 of the EAVP by 6 (e.g., $\Delta CRF=6 \log_2 EAVP$). Thus, when the EAVP indicates the EAPS is below the target, the CRF adjustment is negative, which is subtracted from or otherwise reduces the current CRF value to increase the quantization and thereby likely increases the bitrate associated with the next video segment to bring the EAPS back towards the target bitrate. On the other hand, when the EAVP indicates the EAPS is above the target, the CRF adjustment is positive, which is added to or otherwise increases the current CRF value to decrease the quantization and thereby likely decreases the bitrate associated with the next video segment to bring the EAPS back towards the target bitrate.

In one or more implementations, in addition to the usage-based offset adjustment for the quality factor, a distribution-based offset adjustment is also determined based on the average left and average right tail probabilities for the actual bits per segment. When the right tail probability is too high (e.g., the number of segments with an associated AVB above an upper target threshold), a distribution-based offset adjustment is determined to decrease the quantization and thereby decrease the likelihood of the AVB of the next video segment exceeding the target bitrate and overutilizing available bandwidth. On the other hand, when the left tail probability is too high (e.g., the number of segments with an associated AVB below a lower target threshold), a distribution-based offset adjustment is determined to increase the quantization and thereby decrease the likelihood of the AVB of the next video segment underutilizing the available bandwidth. In exemplary implementations, the distribution-based offset adjustment is calculated in a similar manner as the usage-based offset adjustment but divided by two (or reduced by half) to avoid overreacting to potentially transient or intermittent fluctuations in bitrate.

In some scenarios, when the EAVP is too low and thereby indicates a usage-based offset adjustment to achieve increased quantization and larger AVBs but the right tail probability indicates a distribution-based offset adjustment to decrease the quantization and thereby decrease the likelihood of the AVB of the next video segment exceeding the target bitrate, the usage-based offset adjustment is subtracted from the distribution-based offset adjustment to obtain an aggregate offset adjustment that accounts for the scenario where the average bitrate could otherwise be increased but the current righthand tail distribution of the bitrate usage is too high.

As described above, the rate control process 300 loops to repeat the steps of updating the AVBs in the circular buffer, dynamically determining updated values for the EAPS and EAVP over the most recent subset of compressed and encoded video segments, and determining additional usage-based and/or distribution-based offset adjustments to dynamically adjust the value for the quality factor as appropriate on a segment by segment basis during encoding of the video content of a media program for subsequent transmission and/or distribution. By virtue of the subject matter described herein, the utilization of the available or allocated bandwidth for streaming encoded media content may be improved by attempting to maximize the quality or quantization of the media content during encoding in a manner that reduces the likelihood of exceeding the available or allocated bandwidth. This improves the user experience of the viewer or other end-user consumer of the encoded media content while mitigating the overhead costs associated with underutilizing the allocated bandwidth.

For the sake of brevity, conventional techniques related to broadcasting, streaming, networking, content distribution or delivery, communications standards or protocols, encoding/decoding standards or protocols, content formats, image and/or video processing, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of encoding media content, the method comprising:
  encoding a first portion of the media content using a first value of a quality factor to generate a first encoded portion of the media content, wherein the first encoded portion of the media content is encoded using a first quantization based on the first value for the quality factor;
  storing the first encoded portion of the media content in a transmit buffer;
  determining a first actual bitrate of the first encoded portion of the media content stored in the transmit buffer is outside a threshold range of a target bitrate, wherein the target bitrate is based on a backhaul bandwidth allocated to the media content between an encoding system and a distribution system;
  determining a dynamic adjustment to the quality factor expected to result in the first actual bitrate being within the threshold range of the target bitrate, wherein the dynamic adjustment is determined during the encoding of the media content;
  applying the dynamic adjustment to the quality factor to set an adjusted value of quality factor; and encoding a second portion of the media content using the adjusted value for the quality factor to generate a second encoded portion of the media content at a second actual bitrate within the threshold range of the target bitrate, wherein the second encoded portion of the media content is encoded using a second quantization based on the adjusted value for the quality factor.

2. The method of claim 1, wherein:
determining the first actual bitrate comprises determining an average bitrate associated with the first encoded portion of the media content; and
determining the dynamic adjustment for the quality factor comprises determining the dynamic adjustment based on a difference between the average bitrate and a reference bitrate.

3. The method of claim 2, wherein determining the dynamic adjustment comprises:
determining an amount to adjust the quality factor based on a relationship between the average bitrate and the reference bitrate; and
adjusting the first value of the quality factor by the amount to obtain the adjusted value for the quality factor.

4. The method of claim 3, wherein adjusting the first value by the amount comprises adjusting the first value by the amount to increase the second quantization relative to the first quantization in response to the average bitrate being less than the reference bitrate.

5. The method of claim 3, wherein adjusting the first value by the amount comprises adjusting the first value by the amount to decrease the second quantization relative to the first quantization in response to the average bitrate being greater than the reference bitrate.

6. The method of claim 3, wherein:
determining the amount comprises calculating an offset for adjusting the quality factor based on a ratio of the average bitrate to the reference bitrate; and
adjusting the first value comprises adjusting the first value by the offset.

7. The method of claim 1, wherein:
determining the first actual bitrate comprises determining a metric indicative of a distribution of a bitrate associated with the first encoded portion of the media content; and
determining the dynamic adjustment for the quality factor comprises determining the dynamic adjustment when the metric is greater than a threshold.

8. The method of claim 7, wherein:
determining the metric comprises determining the metric based on a number of segments of the first encoded portion of the media content having a respective bitrate associated therewith that exceeds a reference bitrate; and
determining the dynamic adjustment comprises determining the dynamic adjustment when the number of segments exceeding the reference bitrate is greater than the threshold.

9. The method of claim 1, wherein:
encoding the first portion comprises configuring a codec to encode the first portion of the media content in a rate control mode using the first value for a rate control factor; and
encoding the second portion comprises configuring the codec to encode the second portion of the media content in the rate control mode using the adjusted value for the rate control factor.

10. The method of claim 9, wherein:
the codec comprises an FFmpeg video codec; and
the rate control factor comprises a constant rate factor (CRF) parameter of the FFmpeg video codec.

11. A non-transitory, computer-readable medium having computer-executable instructions stored thereon that, when executed by a processing system, cause the processing system to perform operations, the operations comprising:
encoding a first portion of media content using an initial value of quality factor parameter of a rate control mode to generate a first encoded portion of the media content, wherein the first encoded portion of the media content is encoded using a first quantization based on the initial value for the quality factor parameter;
storing the first encoded portion of the media content in a buffer;
determining a first actual bitrate associated with the first encoded portion of the media content stored in the buffer is outside a threshold range of a target bitrate, wherein the target bitrate is based on a backhaul bandwidth allocated to the media content between an encoding system and a distribution system;
determining a dynamic adjustment for the quality factor parameter expected to maintain the first actual bitrate of the first encoded portion within the threshold range of the target bitrate, wherein the dynamic adjustment is determined while encoding the media content;
applying the dynamic adjustment to the quality factor parameter to set an adjusted value for the quality factor parameter; and
encoding a subsequent portion of the media content using the adjusted value for the quality factor parameter to generate a second encoded portion of the media content at a second actual bitrate within the threshold range of the target bitrate, wherein the second encoded portion of the media content is encoded using a second quantization based on the adjusted value for the quality factor parameter.

12. The computer-readable medium of claim 11, wherein the quality factor parameter comprises a constant rate factor (CRF) parameter for the rate control mode of a video codec.

13. The computer-readable medium of claim 11, wherein the operations further comprise:
determining the first actual bitrate as an average bitrate associated with the first encoded portion of the media content; and
determining the dynamic adjustment for the quality factor parameter to reduce a difference between the average bitrate and a reference bitrate.

14. The computer-readable medium of claim 13, wherein the dynamic adjustment is configured to increase the second quantization relative to the first quantization in response to the average bitrate being less than the reference bitrate.

15. The computer-readable medium of claim 13, wherein the dynamic adjustment is configured to decrease the second quantization relative to the first quantization in response to the average bitrate being greater than the reference bitrate.

16. The computer-readable medium of claim 11, wherein:
the first actual bitrate comprises a first metric indicative of a distribution of a bandwidth associated with the first encoded portion of the media content; and
the dynamic adjustment is configured to decrease the second quantization relative to the first quantization in response to the first metric indicating a probability of the bandwidth exceeding an upper bitrate threshold is greater than a threshold.

17. An encoding system comprising:
a codec module to encode a first portion of media content in a rate control mode using a first value of quality factor to generate a first encoded portion of the media content, wherein the first encoded portion of the media content is encoded using a first quantization based on the first value for the quality factor, wherein the first encoded portion of the media content is stored in a transmit buffer; and a processing system coupled to the codec module to:
determine a first actual bitrate of the first encoded portion of the media content stored in the transmit buffer is outside a threshold range of a target bitrate;
determine a dynamic adjustment for the quality factor expected to result in the first actual bitrate being within the threshold range of the target bitrate;
apply the dynamic adjustment to the quality factor to set an adjusted value of the quality factor different from the first value for the quality factor; and
configure the codec module to encode a subsequent portion of the media content at a second actual bitrate within the threshold range of the target bitrate, wherein the codec module encodes the subsequent portion using a second quantization based on the adjusted value for the quality factor.

18. The encoding system of claim 17, wherein:
the codec module comprises an FFmpeg video codec; and
the quality factor comprises a constant rate factor (CRF) parameter of the rate control mode of the FFmpeg video codec.

* * * * *